(12) United States Patent
Ma (10) Patent No.: US 11,425,299 B2
(45) Date of Patent: Aug. 23, 2022

(54) CAMERA MODULE, PROCESSING METHOD AND APPARATUS, ELECTRONIC DEVICE, AND STORAGE MEDIUM (71) Applicant: Beijing Xiaomi Mobile Software Co., Ltd., Beijing (CN)

(72) Inventor: Kun Ma, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 423 days.

(21) Appl. No.: 16/564,699

(22) Filed: Sep. 9, 2019

(65) Prior Publication Data
US 2020/0084374 A1    Mar. 12, 2020

(30) Foreign Application Priority Data

Sep. 10, 2018   (CN) .......................... 201811052620.4

(51) Int. Cl.
*H04N 5/232*        (2006.01)
*G02B 27/00*        (2006.01)
(Continued)

(52) U.S. Cl.
CPC ..... *H04N 5/23229* (2013.01); *G02B 27/0037* (2013.01); *G06T 11/001* (2013.01);
(Continued)

(58) Field of Classification Search
CPC ............. H04N 5/23299; H04N 5/3696; H04N 13/293; H04N 5/22541; H04N 9/3182;
(Continued)

(56) References Cited

U.S. PATENT DOCUMENTS 8,749,620 B1   6/2014 Knight et al.
9,131,222 B2   9/2015 Hayasaka et al.
(Continued)

FOREIGN PATENT DOCUMENTS

CN      2689459 Y    3/2005
CN    102494771 A    6/2012
(Continued)

OTHER PUBLICATIONS

Office Action of Japanese Application No. 2019-506519, dated Dec. 24, 2020.
(Continued)

*Primary Examiner* — Brenda C Bernardi
(74) *Attorney, Agent, or Firm* — Finnegan, Henderson, Farabow, Garrett & Dunner, L.L.P.

(57) ABSTRACT

A camera module includes: an image sensor including multiple photosensitive pixels; a diffraction structure covering a part of the multiple photosensitive pixels and configured to disperse incident rays irradiating to the part of the multiple photosensitive pixels into diffraction rays with different phases incident to one or more of the part of the multiple photosensitive pixels; and a signal processor acquiring a first sensing signal corresponding to a photosensitive pixel that does not receive the diffraction rays for generating a 2D image, and acquiring a second sensing signal corresponding to the diffraction rays for generating 3D information.

15 Claims, 5 Drawing Sheets

(51) Int. Cl.
G06T 11/00 (2006.01)
H04N 9/31 (2006.01)

(52) U.S. Cl.
CPC ....... *H04N 9/3182* (2013.01); *G06T 2200/04* (2013.01); *G06T 2207/30201* (2013.01)

(58) Field of Classification Search
CPC ............... H04N 13/207; H04N 13/286; G02B 27/0037; G06T 11/001; G06T 2200/04; G06T 2207/30201
See application file for complete search history.

(56) References Cited

U.S. PATENT DOCUMENTS

| | | | |
|---|---|---|---|
| 9,445,018 | B2 | 9/2016 | Fettig et al. |
| 9,712,764 | B2 | 7/2017 | El-Ghoroury et al. |
| 2011/0205339 | A1 | 8/2011 | Pavani et al. |
| 2013/0147919 | A1 | 6/2013 | Xia et al. |
| 2013/0229712 | A1* | 9/2013 | Kress ................. G02B 27/1086 359/572 |
| 2014/0055771 | A1 | 2/2014 | Oggier |
| 2014/0111620 | A1 | 4/2014 | Park et al. |
| 2015/0234148 | A1 | 8/2015 | Kusaka |
| 2016/0248967 | A1 | 8/2016 | Sasaki |
| 2016/0316144 | A1 | 10/2016 | Bhat et al. |

FOREIGN PATENT DOCUMENTS

| | | |
|---|---|---|
| CN | 104204871 A | 12/2014 |
| CN | 108156360 A | 6/2018 |
| EP | 0 367 241 A2 | 5/1990 |
| EP | 2 806 643 A1 | 11/2014 |
| JP | 2012212978 A | 11/2012 |
| JP | 2014/041202 A | 3/2014 |
| JP | 2016156934 A | 9/2016 |
| KR | 2017/0089876 A | 8/2017 |
| RU | 2595759 C2 | 8/2016 |
| RU | 2673953 C2 | 12/2018 |
| WO | WO 2007/052262 A2 | 5/2007 |

OTHER PUBLICATIONS

Office Action of Russian Application No. 2019134154/07 dated Jul. 14, 2020.
Extended European Search Report for Application No. 19196252.1, dated Jan. 22, 2020.
International Search Report of PCT Application No. PCT/CN2018/116016 from State Intellectual Property Office of the P.R. China, dated Feb. 27, 2019.

* cited by examiner

CAMERA MODULE, PROCESSING METHOD AND APPARATUS, ELECTRONIC DEVICE, AND STORAGE MEDIUM

CROSS REFERENCE

This application is based upon and claims priority to Chinese Patent Application No. 201811052620.4, filed on Sep. 10, 2018, the entire contents thereof are incorporated herein by reference.

TECHNICAL FIELD

The present disclosure relates to the field of terminal technologies, and more particularly, to a camera module, a processing method and apparatus, an electronic device, and a storage medium.

BACKGROUND

A 2D image can be collected and generated through a camera module in an electronic device. With the development of 3D face recognition technologies and augmented reality technologies, there is also a demand for collecting 3D information through the electronic device.

In the related art, a 3D information collection function based on structured rays or TOF technology can be realized through adding a 3D information collection component into the electronic device, but this occupies additional device space in the electronic device.

SUMMARY

The present disclosure provides a camera module, a processing method and apparatus, an electronic device, and a storage medium to solve the shortcomings in the related art.

According to a first aspect of the embodiments of the present disclosure, there is provided a camera module, including: an image sensor including multiple photosensitive pixels; a diffraction structure covering a part of the multiple photosensitive pixels and configured to disperse incident rays irradiating to the part of the multiple photosensitive pixels into diffraction rays with different phases incident to one or more of the part of the multiple photosensitive pixels; and a signal processing structure configured to acquire a first sensing signal corresponding to a photosensitive pixel that does not receive the diffraction rays for generating a 2D image, and acquire a second sensing signal corresponding to the diffraction rays for generating 3D information.

According to a second aspect of the embodiments of the present disclosure, there is provided an electronic device including the camera module.

According to a third aspect of the embodiments of the present disclosure, there is provided a processing method applied to the electronic device, including: acquiring a first sensing signal and a second sensing signal outputted by a camera module; generating a 2D image according to the first sensing signal; and generating 3D information according to the second sensing signal.

According to a fourth aspect of the embodiments of the present disclosure, there is provided a processing apparatus applied to the electronic device, including: an acquisition unit for acquiring a first sensing signal and a second sensing signal outputted by the camera module; an image generation unit for generating a 2D image according to the first sensing signal; and an information generation unit for generating 3D information according to the second sensing signal.

According to a fifth aspect of the embodiments of the present disclosure, there is provided an electronic device, including: a processor; and a memory for storing instructions executable by the processor; wherein the processor implements the method in the third aspect by executing the instructions.

According to a sixth aspect of the embodiments of the present disclosure, there is provided a computer readable storage medium storing a computer instruction thereon, wherein the instruction is executed by a processor to implement the method in the third aspect.

It should be understood that the foregoing general description and the following detailed description are exemplary and explanatory only, and cannot limit the present disclosure.

BRIEF DESCRIPTION OF THE DRAWINGS

The accompanying drawings herein are incorporated in and constitute a part of this description, illustrate the embodiments, and serve to explain the principles of the invention together with the description.

DETAILED DESCRIPTION

Reference will now be made in detail to exemplary embodiments, examples of which are illustrated in the accompanying drawings. When the following description refers to the drawings, the same numbers in different drawings indicate the same or similar elements unless otherwise indicated. The implementation manners described in the following exemplary embodiments do not represent all the implementation manners consistent with the specification. On the contrary, they are merely examples of apparatuses and methods consistent with some aspects of the specification.

The terms used in the specification are for the purpose of describing specific embodiments only, and are not intended to limit the specification. As used in the specification, the singular forms "a" and "the" are also intended to include plural forms unless the context clearly indicates otherwise. It will also be understood that, the term "and/or" as used herein refers to and encompasses any and all possible combinations of one or more of the associated listed items.

It should be understood that although the terms first, second, third, etc. may be used in the specification to describe various information, such information should not be limited to these terms. These terms are only used to distinguish the same type of information from each other. For example, without departing from the scope of the specification, first information may also be referred to as second information, and similarly, the second information may also be referred to as the first information. Depending on the context, the word "if" as used herein may be interpreted as "at the moment of . . . ", or "when", or "in response to determination".

Figure 1:
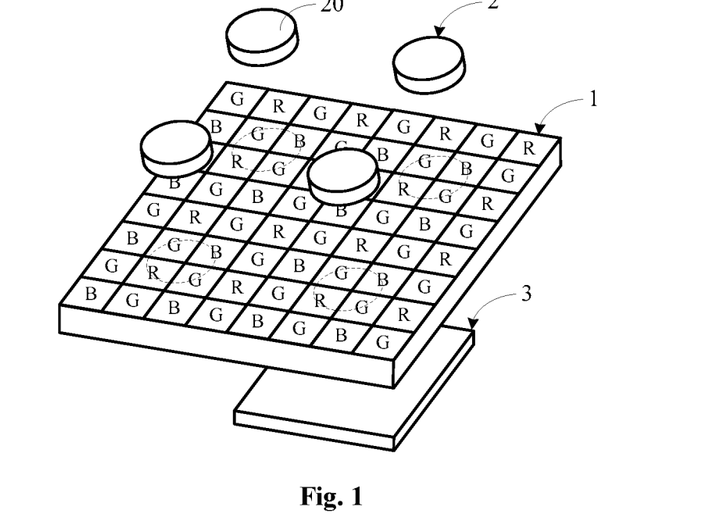
FIG. 1 is a structural schematic diagram illustrating a camera module according to an exemplary embodiment.

FIG. 1 is a structural schematic diagram illustrating a camera module according to an exemplary embodiment. As shown in FIG. 1, the camera module includes an image sensor 1, a diffraction structure 2, and a signal processing structure 3. The image sensor 1 includes a plurality of photosensitive pixels, and these photosensitive pixels form R (red), G (green) and B (blue) photosensitive pixel arrays as shown in FIG. 1 for sensing rays irradiating to the image sensor 1. The diffraction structure 2 may cover partial photosensitive pixels on the image sensor 1. For example, the pixel arrays in FIG. 1 contain 64 photosensitive pixels, wherein the diffraction structure 2 covers 16 photosensitive pixels, and may disperse incident rays irradiating to the covered photosensitive pixels into diffraction rays with different phases incident to one or more photosensitive pixels (that is, one photosensitive pixel can receive the diffraction rays of one or more phases). The signal processing structure 3 can acquire a first sensing signal corresponding to the photosensitive pixel that does not receive the diffraction rays for generating a 2D image, and the signal processing structure 3 can acquire a second sensing signal corresponding to the diffraction rays for generating 3D information.

Therefore, the electronic device can have 2D image and 3D information collection functions by assembling the camera module based on the present disclosure in the electronic device without additionally installing a separate 3D information collection component, avoiding extra space occupation to the electronic device. Since the diffraction structure 2 only covers partial photosensitive pixels of the image sensor 1, an influence on the generation of the 2D image can be reduced as much as possible on the basis of ensuring the acquisition of the 3D information, so as to avoid reducing the quality of the 2D image.

In an embodiment, the diffraction structure 2 may be made of any material capable of realizing the diffraction function, and is not limited by the present disclosure. For example, the diffraction structure 2 may be a diffraction lens; for another example, the diffraction structure 2 may be a diffraction film or the like.

In an embodiment, a Bayer array is used in the image sensor 1 in the embodiment as shown in FIG. 1 to arrange RBG photosensitive pixels, but the present disclosure is also applied to any other types of pixel arrangement methods, such as RGBW pixel arrangement, X-Trans pixel arrangement, etc. in the related art, which is not limited by the present disclosure.

Figure 2:
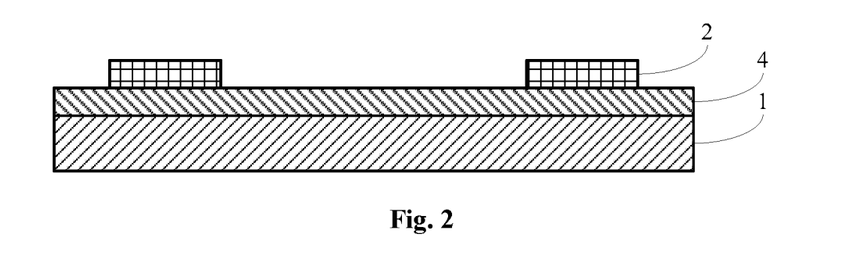
FIG. 2 is a sectional view of a camera module according to an exemplary embodiment.
Figure 3:
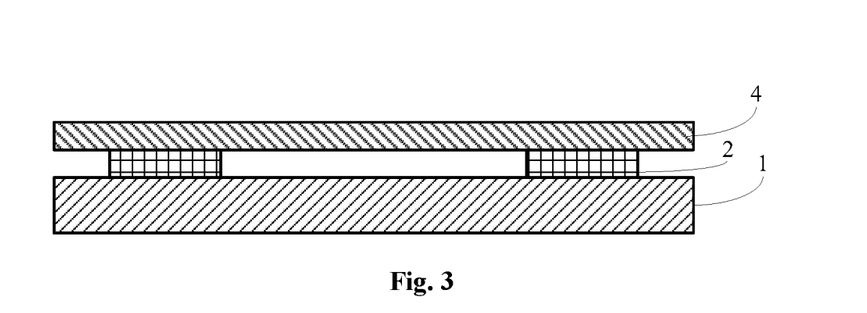
FIG. 3 is a sectional view of another camera module according to an exemplary embodiment.

In the technical solutions of the present disclosure, it is only necessary to ensure that the diffraction structure 2 can diffract the rays irradiating to the image sensor 1 (the rays irradiating to the photosensitive pixels covered by the diffraction structure 2), that is, the diffraction structure 2 may be located in front of the image sensor 1 regardless of a position relationship between the diffraction structure 2 and other structures in the camera module. For example, FIG. 2 is a sectional view of a camera module illustrated according to an exemplary embodiment. As shown in FIG. 2, the camera module may further include a color filter 4 in addition to the image sensor 1 and the diffraction structure 2. The diffraction structure 2 may be located at a side of the color filter 4 away from the image sensor 1 (or the photosensitive pixel), that is, the diffraction structure 2, the color filter 4 and the image sensor 1 are sequentially stacked. For another example, FIG. 3 is a sectional view of another camera module illustrated according to an exemplary embodiment. As shown in FIG. 3, the diffractive structure 2 may be located between the image sensor 1 (or the photosensitive pixel) and the color filter 4.

In the technical solutions of the present disclosure, the diffraction structure 2 may include a plurality of diffraction regions 20, such as four diffraction regions 20 in the embodiment as shown in FIG. 1, while other embodiments may include other numbers (one or more) of diffraction regions 20, which is not limited by the present disclosure. Each diffraction region 20 may take any shape, such as a circle or other ellipse, rectangle, or the like, as shown in FIG. 1, which is not limited by the present disclosure.

With reference to the embodiments as shown in FIGS. 2 and 3, the plurality of diffraction regions 20 contained in the diffraction structure 2 are often located in the same layer, a distance between each diffraction region 20 and the image sensor 1 is equal, and these diffraction regions 20 may be separated from each other, or may be integrally connected through a transparent material, which is not limited by the present disclosure.

Figure 4:
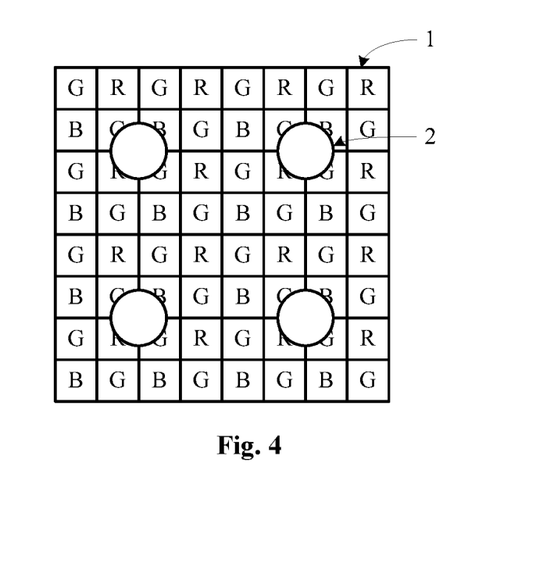
FIG. 4 is a schematic diagram illustrating uniform distribution of diffraction regions according to an exemplary embodiment.
Figure 5:
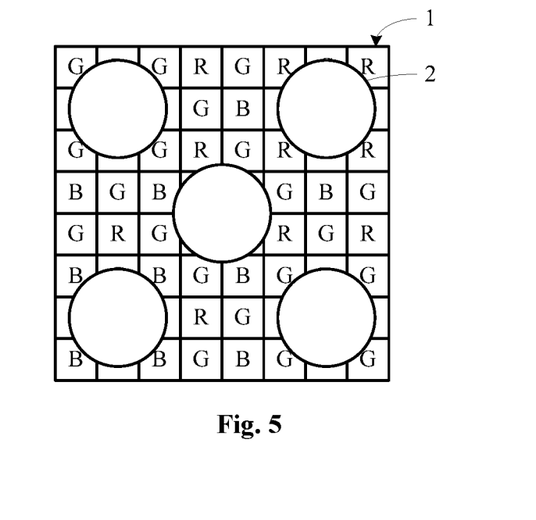
FIG. 5 is a schematic diagram illustrating uniform distribution of diffraction regions according to an exemplary embodiment.

FIG. 4 is a schematic diagram illustrating uniform distribution of diffraction regions according to an exemplary embodiment. As shown in FIG. 4, the diffraction structure 2 may include four diffraction regions 20, and these diffraction regions 20 may be uniformly distributed above a pixel array formed by the image sensor 1, so that an impact of the diffraction structure 2 on the 2D image is also uniformly shared to various positions, thus avoiding a large impact on the 2D image locally. Similarly, FIG. 5 is a schematic diagram illustrating another uniform distribution of diffraction regions according to an exemplary embodiment. As shown in FIG. 5, the diffractive structure 2 may include five diffractive regions 20 which may be uniformly distributed above the pixel array formed by the image sensor 1.

In addition to different numbers of the diffraction regions 20, the numbers of the photosensitive pixels covered by each diffraction region 20 in the embodiments as shown in FIGS. 4 and 5 are also different. For example, each diffraction region 20 in FIG. 4 may cover four photosensitive regions and each diffraction region 20 in FIG. 5 may cover nine or more photosensitive regions. Each diffraction region 20 in the technical solutions of the present disclosure may cover one or more photosensitive pixels, and the present disclosure does not limit the number of the covered photosensitive pixels.

Figure 6:
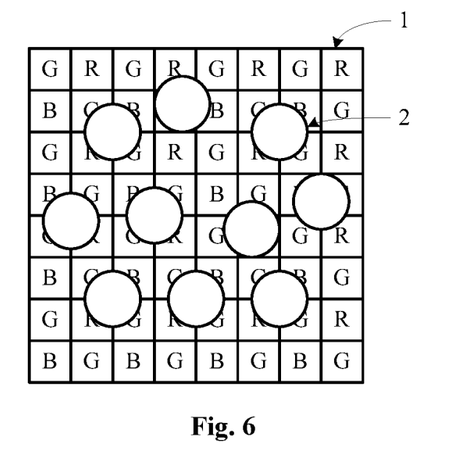
FIG. 6 is a schematic diagram illustrating random distribution of diffraction regions according to an exemplary embodiment.

FIG. 6 is a schematic diagram illustrating random distribution of diffraction regions according to an exemplary embodiment. As shown in FIG. 6, when the diffraction structure 2 includes a plurality of diffraction regions 20, these diffraction regions 20 can be randomly distributed above the pixel array formed by the image sensor 1, as long as the corresponding diffraction function can be implemented, and the 2D image and the 3D information can be generated.

Figure 7:
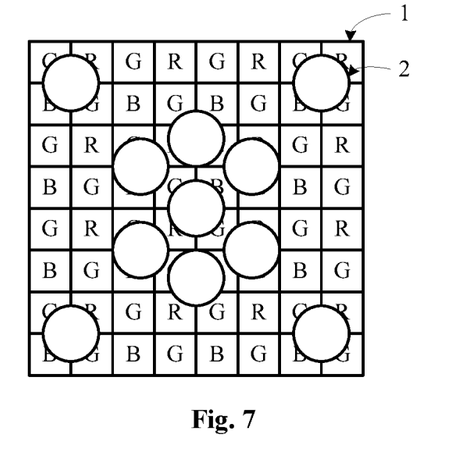
FIG. 7 is a schematic diagram illustrating ordered distribution of diffraction regions according to an exemplary embodiment.

FIG. 7 is a schematic diagram illustrating ordered distribution of diffraction regions according to an exemplary embodiment. In the photosensitive pixel array composed of the photosensitive pixels on the image sensor 1, a distribution density of the plurality of diffraction regions 20 in a central region of the photosensitive pixel array can be higher than that in an edge region. For example, in the embodiment as shown in FIG. 7, seven diffraction regions 20 can be distributed in the central region and only four diffraction regions 20 are arranged in the edge region, so that more 3D information can be acquired in the more important central region, which is conductive to improving a recognition accuracy in scenarios such as 3D face recognition.

It should be noted that when the diffraction structure 2 includes the plurality of diffraction regions 20, these diffraction regions 20 may be separated from each other, so that the same photosensitive pixel can only receive the diffraction rays formed by one diffraction region 20, so as to avoid the diffraction rays formed by the plurality of diffraction regions 20 from irradiating to the same photosensitive pixel, thus ensuring that the finally acquired 3D information has sufficient accuracy.

In the technical solutions of the present disclosure, the camera module based on any one of the embodiments above can be applied to an electronic device, for example, the camera module can be used as a front camera or a rear camera of the electronic device, or can be used as both the front camera and the rear camera at the same time (the same camera can be used as both the front camera and the rear camera; or, a part of the multiple cameras are used as the front cameras and the others are used as the rear cameras), so that the camera module not only can be used to collect the 2D image, but also can be used to generate the 3D information. The electronic device may be a mobile phone, a tablet computer, a notebook computer, a wearable device, etc., which is not limited by the present disclosure.

In an embodiment, a processor of the electronic device can acquire a first sensing signal and a second sensing signal outputted by the camera module to generate a 2D image according to the first sensing signal and generate 3D information according to the second sensing signal. A processing logic of the processor is described in detail hereinafter with reference to FIG. 8.

Figure 8:
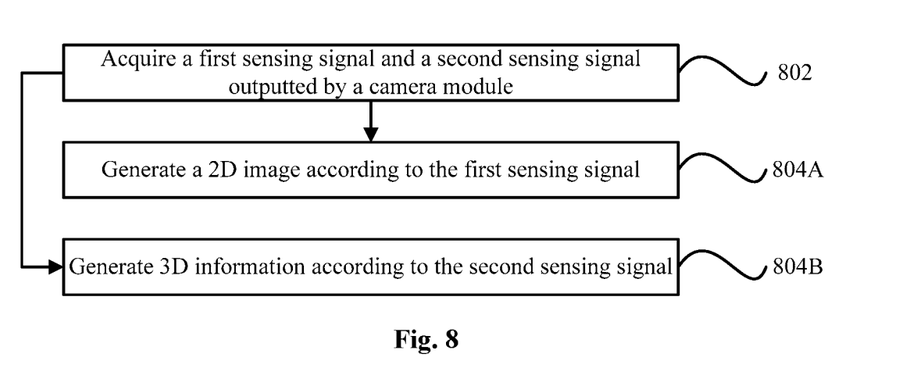
FIG. 8 is a flow chart illustrating a processing method according to an exemplary embodiment.

FIG. 8 is a flow chart illustrating a processing method according to an exemplary embodiment. As shown in FIG. 8, the method is applied to the foregoing electronic device, and may include the following steps.

In step 802, a first sensing signal and a second sensing signal outputted by a camera module are acquired.

In an embodiment, the camera module has an ability to output the first sensing signal and the second sensing signal at the same time. In an embodiment, the camera module can output the first sensing signal or the second sensing signal at a time, or can output the first sensing signal and the second sensing signal at the same time, which depends on the demand of the processor in the electronic device.

In an embodiment, the camera module can output the first sensing signal and the second sensing signal at the same time, while the processor can, according to actual needs, select to generate the 2D image according to the first sensing signal or generate the 3D information according to the second sensing signal, or generate the 2D image and the 3D information at the same time.

In step 804A, a 2D image is generated according to the first sensing signal.

In an embodiment, the processor can directly process the first sensing signal and the second sensing signal to generate the 2D image.

In an embodiment, since the second sensing signal contains the 3D information, which may adversely affect the 2D image, signal compensation can be conducted to the photosensitive pixels receiving the diffraction rays according to the first sensing signal, and a compensated signal acquired and the first sensing signal are processed to generate the 2D image. The compensation process above may be to correct the second sensing signal based on the first sensing signal, or to completely discard the second sensing signal, and interpolate and repair the photosensitive pixels receiving the diffraction rays based on the first sensing signal only.

In step 804B, 3D information is generated according to the second sensing signal.

In an embodiment, the 3D information at a corresponding position of any photosensitive pixel is generated by the second sensing signal that is sensed by at least one of a photosensitive pixel close to the any photosensitive pixel and a photosensitive pixel away from the any photosensitive pixel. For example, when the 3D information at a certain position is generated, reference made to the second sensing signal sensed by the photosensitive pixel distant from that position is conductive to improving a baseline between acquired pixels of the 3D information, and improving the accuracy of the generated 3D information.

In an embodiment, reference may be made to the 3D information generation solutions in the related art to enable the processor to generate the 3D information based on the second sensing signal corresponding to the diffraction rays. The present disclosure does not limit the contents of the 3D information generation solutions adopted. For example, a principle of a 3D information generation solution may include: dividing the photosensitive pixels into a plurality of groups, wherein one group of photosensitive pixels includes at least one pixel with one side being covered by the diffraction structure 2 as shown in FIG. 1, and at least one of other pixels with the other side being covered by the diffraction structure 2, so that the second sensing signals sensed by these pixels may be combined into one group to simulate a ray receiving scene corresponding to a binocular camera, thus calculating the corresponding 3D information (such as a depth of an object that is shot).

Corresponding to the above-mentioned embodiments of the processing method, the present disclosure further provides embodiments of a processing apparatus.

Figure 9:
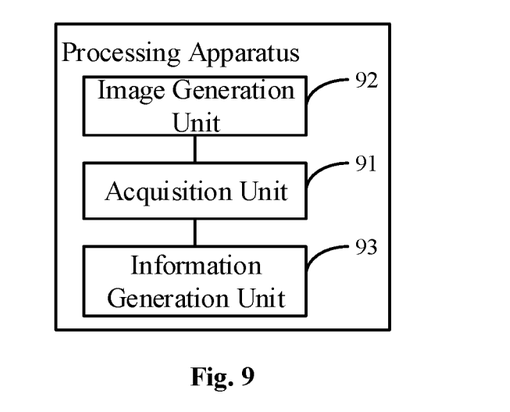
FIG. 9 is a block diagram illustrating a processing apparatus according to an exemplary embodiment.

FIG. 9 is a block diagram illustrating a processing apparatus according to an exemplary embodiment. Referring to FIG. 9, the apparatus includes: an acquisition unit 91 for acquiring a first sensing signal and a second sensing signal outputted by a camera module; an image generation unit 92 for generating a 2D image according to the first sensing signal; and an information generation unit 93 for generating 3D information according to the second sensing signal.

In an embodiment, the 3D information at a corresponding position of any photosensitive pixel is generated by the second sensing signal that is sensed by at least one of a photosensitive pixel close to the any photosensitive pixel and a photosensitive pixel away from the any photosensitive pixel.

Figure 10:
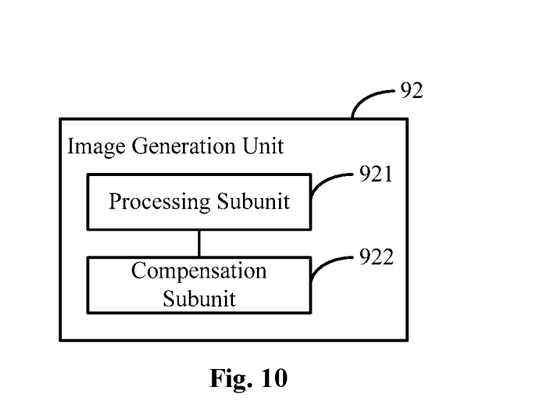
FIG. 10 is a block diagram illustrating another processing apparatus according to an exemplary embodiment.

FIG. 10 is a block diagram illustrating another processing apparatus according to an exemplary embodiment. The embodiment is based on the forgoing embodiment as shown in FIG. 9, and the image generation unit 92 further includes a processing subunit 921 or a compensation subunit 922.

The processing subunit 921 is configured to process the first sensing signal and the second sensing signal to generate the 2D image; and the compensation subunit 922 is configured to conduct signal compensation to photosensitive pixels receiving the diffraction rays according to the first sensing signal, and process a compensated signal acquired and the first sensing signal to generate the 2D image.

With respect to the apparatuses in the above embodiments, specific manners for performing operations for individual modules have been described in detail in the embodiments regarding the methods, which will not be elaborated herein.

Since the apparatus embodiments are basically corresponding to the method embodiments, reference may be made to the method embodiments for detail. The apparatus embodiments described above are only exemplary, wherein the units illustrated as separated parts may be or may not be physically separated, and may be or may not be physical units, that is, may be located in one place, or may be distributed on a network. Some or all of the units may be selected according to actual needs to achieve the objectives of the solutions of the present disclosure. Those of ordinary skill in the art can understand and implement without going through any creative efforts.

The present disclosure further provides a processing apparatus, including: a processor; and a memory for storing instructions executable by the processor; wherein, the processor is configured to implement any one of the processing methods in the foregoing embodiments by operating the executable instructions.

The present disclosure further provides a terminal including a memory and one or more programs, wherein the one or more programs are stored in the memory and configured to be executed by one or more processors for performing following operations: acquiring a first sensing signal and a second sensing signal outputted by a camera module; generating a 2D image according to the first sensing signal; and generating 3D information according to the second sensing signal.

In an embodiment, generating the 2D image according to the first sensing signal includes: processing the first sensing signal and the second sensing signal to generate the 2D image; or conducting signal compensation to photosensitive pixels receiving the diffraction rays according to the first sensing signal, and processing a compensated signal acquired and the first sensing signal to generate the 2D image.

In an embodiment, the 3D information at a corresponding position of any photosensitive pixel is generated by the second sensing signal that is sensed by at least one of a photosensitive pixel close to the any photosensitive pixel and a photosensitive pixel away from the any photosensitive pixel.

Figure 11:
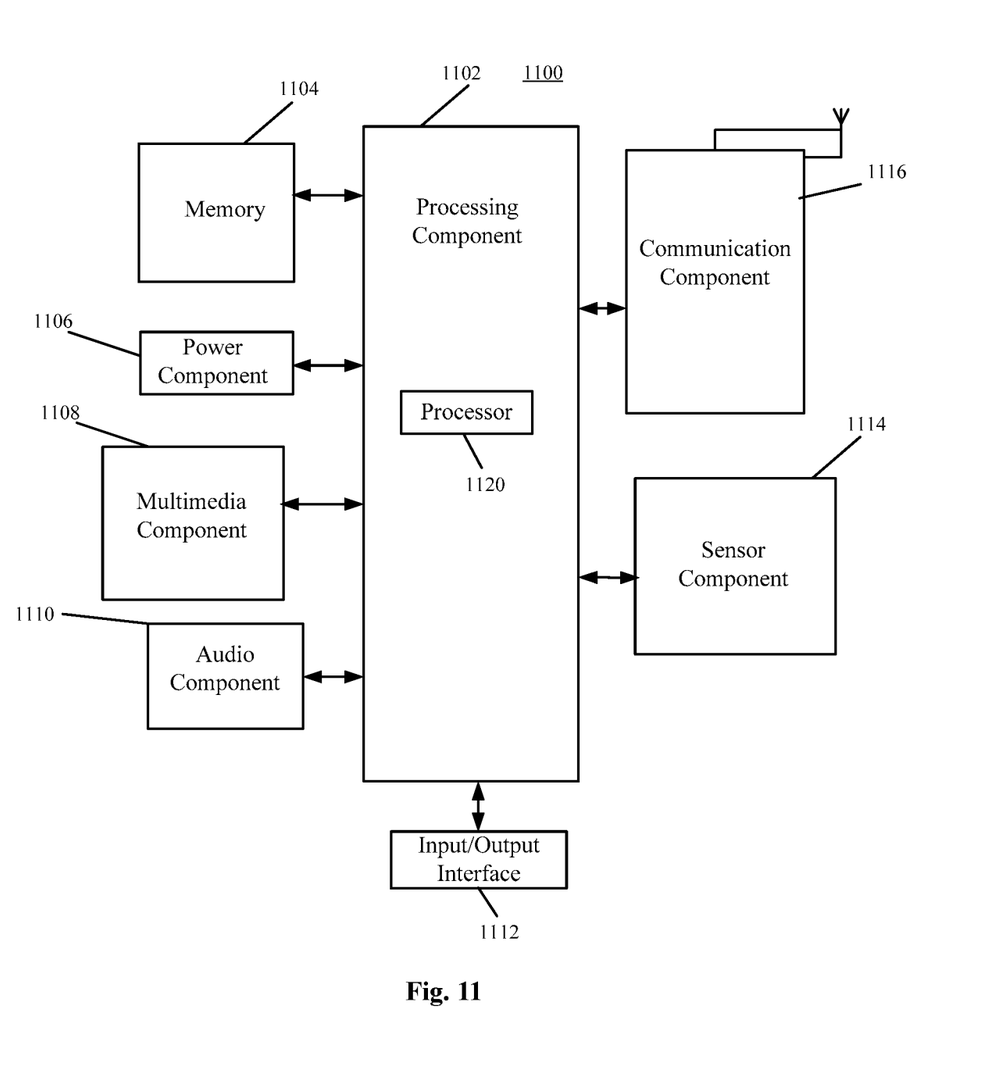
FIG. 11 is a block diagram illustrating a processing apparatus according to an exemplary embodiment.

FIG. 11 is a schematic diagram illustrating a processing apparatus 1100 according to an exemplary embodiment. For example, the apparatus 1100 may be a mobile phone, a computer, a digital broadcast terminal, a messaging device, a gaming console, a tablet device, a medical device, a fitness device, a personal digital assistant, and the like.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the apparatus 1100 is in an operation mode, such as a photographing mode or a video mode. Each of the front camera and the rear camera may be a fixed optical lens system or have focus and optical zoom capability. A camera module based on the technical solutions of the present disclosure may be adopted as the front camera and/or the rear camera, and the camera module has the functions of collecting 2D images and 3D information, and can select the 2D images and/or 3D information according to actual needs.

The audio component 1110 is configured to output and/or input audio signals. For example, the audio component 1110 includes a microphone ("MIC") configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 4G, or 5G, or a combination thereof. In one exemplary embodiment, the communication component 1116 receives a broadcast signal or broadcast associated information from an external broadcast management system via a broadcast channel In one exemplary embodiment, the communication component 1116 further includes a near field communication (NFC) module to facilitate short-range communications. In one exemplary embodiment, the communication component 1116 may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1104, executable by the processor 1120 in the apparatus 1100, for performing the above-described methods. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. The scope of the present disclosure is limited by the appended claims only.

What is claimed is:

1. A camera module, comprising:
   an image sensor comprising multiple photosensitive pixels;
   a diffraction structure covering a part of the multiple photosensitive pixels and configured to disperse incident rays irradiating to the part of the multiple photosensitive pixels into diffraction rays with different phases incident to one or more of the part of the multiple photosensitive pixels; and
   a signal processor configured to acquire a first sensing signal corresponding to a photosensitive pixel not covered by the diffraction structure for generating a 2D image, and acquire a second sensing signal corresponding to the diffraction rays for generating 3D information.

2. The camera module according to claim 1, wherein the diffraction structure comprises a plurality of diffraction regions, and each diffraction region covers one or more photosensitive pixels.

3. The camera module according to claim 2, wherein the diffraction regions are separated from each other, causing any one of the one or more photosensitive pixels to only receive the diffraction rays formed in one diffraction region.

4. The camera module according to claim 2, wherein the multiple photosensitive pixels constitute a photosensitive pixel array, and the plurality of diffraction regions are uniformly distributed above the photosensitive pixel array.

5. The camera module according to claim 2, wherein the multiple photosensitive pixels constitute a photosensitive pixel array, and a central region of the photosensitive pixel array has a higher distribution density of diffraction regions than an edge region of the photosensitive pixel array.

6. The camera module according to claim 1, wherein the diffraction structure comprises a diffraction lens or a diffraction film.

7. The camera module according to claim 1, wherein the camera module further comprises a color filter covering at least some of the multiple photosensitive pixels;
   wherein, the diffraction structure is located between the multiple photosensitive pixels and the color filter, or the diffraction structure is located at a side of the color filter away from the multiple photosensitive pixels.

8. An electronic device, comprising the camera module according to claim 1.

9. The electronic device according to claim 8, wherein at least one of a front camera and a rear camera of the electronic device comprises the camera module.

10. A processing method implemented on an electronic device comprising a camera module, wherein the camera module comprises: an image sensor comprising multiple photosensitive pixels; a diffraction structure covering a part of the multiple photosensitive pixels and configured to disperse incident rays irradiating to the part of the multiple photosensitive pixels into diffraction rays with different phases incident to one or more photosensitive pixels; and a signal processor configured to acquire a first sensing signal corresponding to a photosensitive pixel not covered by the diffraction structure for generating a 2D image, and acquire a second sensing signal corresponding to the diffraction rays for generating 3D information, the processing method comprising:
  acquiring the first sensing signal and the second sensing signal outputted by the camera module;
  generating the 2D image according to the first sensing signal; and
  generating the 3D information according to the second sensing signal.

11. The method according to claim 10, wherein the generating the 2D image according to the first sensing signal comprises:
  processing the first sensing signal and the second sensing signal to generate the 2D image.

12. The method according to claim 10, wherein the generating the 2D image according to the first sensing signal comprises:
  conducting signal compensation to photosensitive pixels receiving the diffraction rays according to the first sensing signal, and processing a derived signal through the signal compensation and the first sensing signal to generate the 2D image.

13. The method according to claim 10, wherein the generating the 3D information according to the second sensing signal comprises:
  generating the 3D information at a corresponding position of any photosensitive pixel according to the second sensing signal sensed by at least one of a photosensitive pixel adjacent to the any photosensitive pixel and a photosensitive pixel away from the any photosensitive pixel.

14. An electronic device, comprising:
  a processor; and
  a memory for storing instructions executable by the processor;
  wherein the processor implements the method according to claim 10 by executing the instructions.

15. A computer readable storage medium storing a computer instruction thereon, wherein the instruction is executed by a processor to implement the method according to claim 10.

* * * * *